United States Patent

[11] 3,621,255

[72] Inventor  Robert J. Schwartz
              Houston, Tex.
[21] Appl. No. 863,771
[22] Filed     Oct. 2, 1969
[45] Patented  Nov. 16, 1971
[73] Assignee  Schlumberger Technology Corporation
               New York, N.Y.

[54] TWO DETECTOR PULSE NEUTRON LOGGING POROSITY TECHNIQUE
     3 Claims, 2 Drawing Figs.
[52] U.S. Cl. ........................................... 250/83.1,
                           250/71.5, 250/83.3, 250/83.6
[51] Int. Cl. ........................................... G01t 3/00,
                                                         G01v 5/00
[50] Field of Search ........................................... 250/83.1,
                                                    83.6 W, 83.3, 71.5

[56]              References Cited
              UNITED STATES PATENTS
3,373,280   3/1968   Mills, Jr. ..................... 250/83.6 W
3,379,882   4/1968   Youmans ..................... 250/83.6 W
                    OTHER REFERENCES
  Hewlett-Packard; Electronic Test Instruments; Catalog No. 24; pp. 120–123, 132; 133; 1963

*Primary Examiner*—James W. Lawrence
*Assistant Examiner*—Morton J. Frome

ABSTRACT: An illustrative embodiment of the invention discloses a technique for reducing the influence of borehole characteristics on earth formation porosity measurements. Measurements of this sort are accomplished with a borehole logging tool that comprises two neutron detectors spaced at different distances from a pulsed neutron generator. The thermal neutron decay time of the short-spaced detector identifies that portion of the time-dependent population that is most indicative of the formation porosity. Both detectors then register the portion of the neutron distribution so identified to produce two signals from which a ratio is computed that is related to the porosity of the formation.

PATENTED NOV 16 1971

3,621,255

INVENTOR.
Robert J. Schwartz
BY
John P. Sinnott
ATTORNEY

TWO DETECTOR PULSE NEUTRON LOGGING POROSITY TECHNIQUE

This is a continuation of U.S. application Ser. No. 705,154 that was filed on Feb. 13, 1968.

BACKGROUND OF THE INVENTION

Field of the Invention

This invention relates to borehole logging techniques, and more particularly, to a device for measuring earth formation porosity in accordance with the behavior of neutrons in the formation, and the like.

Description of the Prior Art

Ordinarily, the earth formations that promise the best potential oil production are very porous. Consequently, equipment and methods for accurately identifying porous earth formations are of substantial industrial importance.

Various tools have been proposed to measure porosity or other closely related formation characteristics. Typically, proposals of this sort suggest a pressure housing that contains a neutron source and a pair of neutron detectors spaced at different distances from the source for transport through a borehole. The detectors generate signals in response to the diffusion of the emitted neutrons through an adjacent earth formation. These detector signals usually can be related to the hydrogen content of the portion of the earth formation under consideration. Because the formation environment immediately adjacent to the borehole often is cased with steel pipe and irregular annuli of cement, the neutron distribution registered by the detectors in these circumstances frequently does not reflect the true formation porosity.

Accordingly, a need exists for an improved logging tool that can measure formation porosity with increased accuracy in spite of borehole casing materials.

Thus, it is an object of the invention to provide an improved tool for measuring the porosity of an earth formation.

It is another object of the invention to provide an improved tool for measuring a time-dependent neutron population in order to identify that portion of the neutron distribution that characterizes the formation porosity to the substantial exclusion of borehole influences.

SUMMARY

In accordance with the invention, a neutron generator irradiates a surrounding earth formation with timed bursts or pulses of neutrons. A pair of neutron detectors within the tool are spaced at different distances from the neutron generator. One of the detector signals establishes that portion of the time between successive bursts in which the neutron time-distribution is most clearly related to the formation porosity. These detectors produce signals that are combined to establish a ratio of the neutrons or "counts" during the interval so selected. The ratio of these two detector signals is interpreted in terms of the earth formation porosity in accordance with a predetermined relation developed, for example, through a series of tool response tests conducted in different formations of known characteristics. The count ratio, moreover, may be determined in the manner described in more complete detail in U.S. Pat. application Ser. No. 570,068 filed Aug. 3, 1966, for "Measuring Apparatus and Method" by Stanley Locke, Harold Sherman and John S. Wahl. A typical neutron tool in which the bursts and detection intervals are regulated is described more fully in U.S. Pat. application Ser. No. 592,795 filed Nov. 8, 1966 for "Method and Apparatus for Measuring Neutron Characteristics of a Material" by William B. Nelligan. Both of these patent applications are assigned to the same assignee as the invention described herein.

For a better understanding of the present invention, together with other and further objects thereof, reference is had to the following description taken in connection with the accompanying drawing, the scope of the invention being pointed out in the appended claims.

DESCRIPTION OF THE PREFERRED EMBODIMENTS

Figure 1:
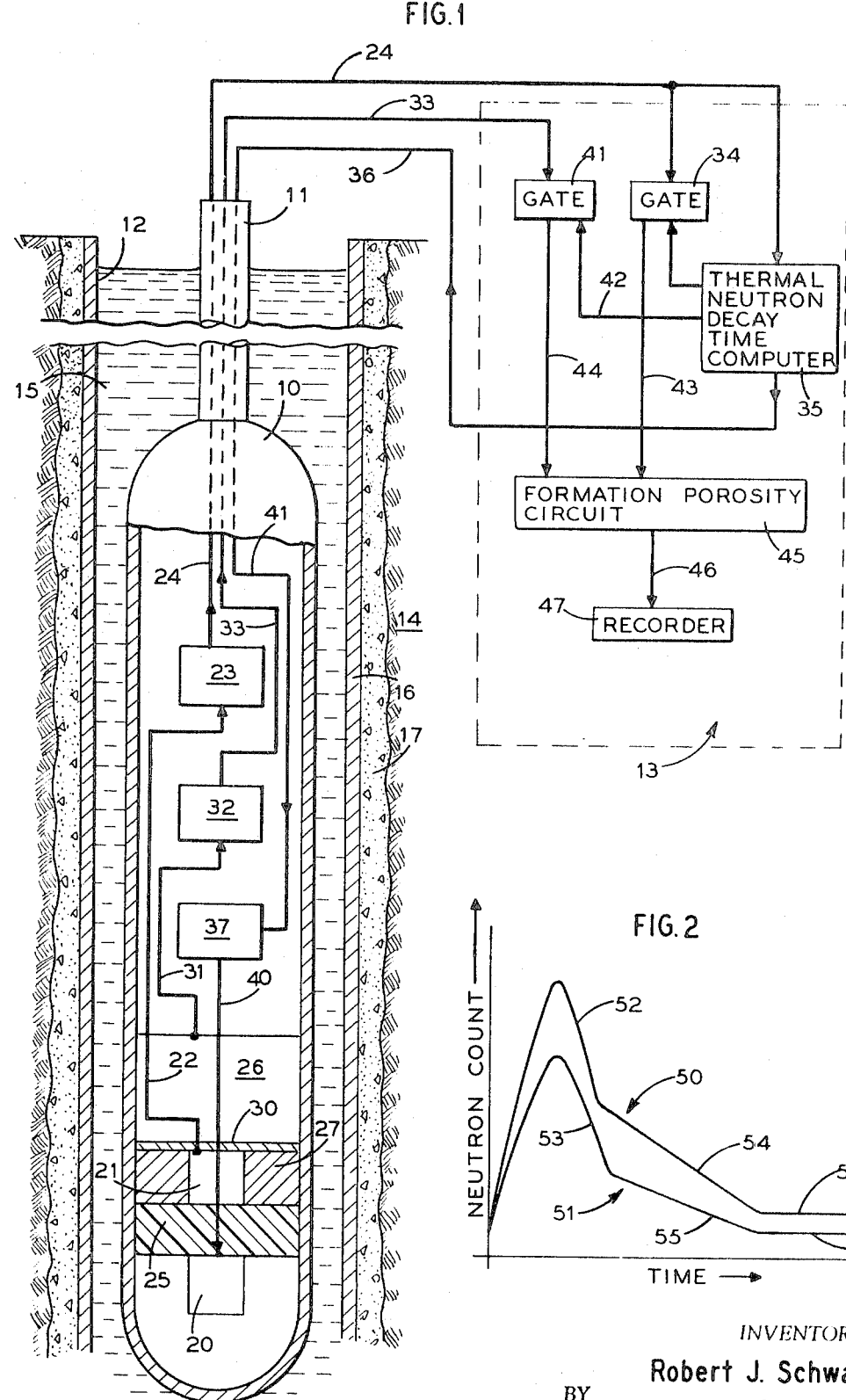
FIG. 1 of the drawing is a schematic diagram of an exemplary tool embodying the principles of the invention, in which the electrical circuits associated therewith are shown in block diagram form.

In order to appreciate more fully the advantages of the present invention, a typical apparatus is shown in FIG. 1 of the drawing.

A fluidtight pressure-resistant housing 10 is suspended by an armored cable 11 in a borehole 12. As will be described later in detail, cable 11 may comprise a group of insulated conductors that electrically connect the equipment within the housing 10 with a computer circuit 13 at the earth's surface. A winch (not shown) is located at the surface and is used to lower and raise the housing 10 in the borehole 12 in the customary manner to traverse earth formations 14.

The borehole 12 may be dry, or may be filled with a borehole fluid 15, as shown. The borehole 12, moreover, may be uncased, or lined with one or more strings of steel casing 16 and irregular annuli of concrete 17, also as shown.

Supported in the lowermost end of the housing 10 is a pulsed neutron source 20 for irradiating the earth formation 14 with successive pulses of neutrons. The pulsed neutron source 20 shown in the exemplary embodiment may be of the type described in U.S. Pat. No. 2,914,677 granted to Wayne R. Arnold on Nov. 24, 1959, for "Well Logging Apparatus" and assigned to the a assignee of the invention described herein.

The rate at which the neutrons in each of the bursts are dissipated is a function, to a large extent, of the neutron absorption and diffusion characteristics of the formation 14 and the borehole 12. To observe these formation characteristics, the effective center of a neutron detector 21 is spaced axially from the effective center of the pulsed neutron source 20. Optimum source-detector separations are chosen on the basis of formation characteristics, source strength, detector sensitivity and other environmental conditions that are readily ascertained through trials with laboratory formations in which all of the variables in question are known.

The neutron detector 21 may be a crystal scintillation counter for registering gamma radiation emitted from the formation 14 as a consequence of the absorption of irradiating neutrons, inasmuch as the neutron capture gamma radiation is related to the neutron distribution. Typically, however, a helium-3 ($He^3$) gas-filled counting tube that responds to neutrons scattered back to the detector 21 through collisions with nuclei in the formation 14 produces a more satisfactory result. Charge pulses established from nuclear reactions between these backscattered neutrons and the filling gas within the detector 21 provide a measure of the neutron population under observation. A signal related to these charge pulses or "-counts" is sent to the earth's surface through a path that includes a conductor 22, a signal transmission circuit 23 and a conductor 24 in the armored cable 11. The signal transmission circuit 23 illustratively may comprise charge pulse amplifiers, scaling circuits and pulse height discrimination circuits.

The portion of the housing 10 between the pulsed source 20 and the detector 21 preferably is filled with a shield 25 formed of a neutron absorbing material, a moderating material, or an appropriate combination of these substances, for example, graphite and boron.

Spaced vertically above the neutron detector 21 is a second neutron detector 26, which may be of a type similar to the detector 21.

Typical dimensions for detectors 21 and 26 are, for example, 7-¼ inches in length and 1-¾ inches in diameter and 9-¼ inches in length and 2-¾ inches in diameter respectively. Because of the dense neutron population in the vicinity of the detector 21, the transverse area of that detector is substantially less than the corresponding transverse area of the housing 10. The annulus formed between detector 21 and the housing 10 is filled by a sleeve 27 of aluminum, or some similar material that is relatively transparent to neutrons.

The detectors 21 and 26 are positioned in approximately an end-to-end abutting relation to minimize the separation between the two counters. The large active volume of the detector 26 provides the maximum neutron sensitivity attainable within the constraints imposed by a reasonable housing diameter. This arrangement of nested detectors, in which the most distantly spaced detector 26 has a maximum neutron sensitivity, is provided to compensate for the relatively diminished neutron population in the vicinity of the detector caused by the almost logarithmic decline in neutron population with separation from the source 20. The output signal from the neutron detector 26 is transmitted through a conductor 31 to the computer circuit 13 on the earth's surface through a path that includes a downhole signal transmission circuit 32 and a conductor 33 in the armored cable 11.

Turning once more to the signal from the detector 21, a gate 34 is coupled at the earth's surface to the conductor 24. The signal from the detector 21 in the conductor 24 also is applied to a thermal neutron decay time computer 35, as described more fully in the Nelligan patent application hereinbefore considered.

Briefly, the computer 35 measures the rate of absorption for those neutrons in each burst that are reduced in kinetic energy to the same average kinetic energy as the substance through which the neutrons are diffusing. By way of background, repetitive bursts of neutrons are emitted from the source 20. The successive bursts are spaced from each other by intervals of about nine decay times in length. A first neutron count is taken during an interval one decay time long that begins two decay times after the preceding neutron pulse has terminated. A second neutron count is taken during another interval immediately after the first interval. The second counting interval is two decay times long. If capture gamma ray detection is employed, a background count also may be taken during an interval at least seven decay times after the preceding neutron pulse has terminated. The background count is subtracted proportionately from the first and second interval counts to eliminate the undesirable effect of the background on the decay time calculation.

The adjacent time intervals are set at one and two decay times, respectively, when the ratio of the counting rate in the first interval to the counting rate in the second interval is a fixed number, 1.99. The circuit described in the aforementioned Nelligan patent application shows an illustrative apparatus for adjusting the time intervals in a two-to-one ratio until the counting rate ratios equal 1.99.

The duration of the neutron irradiation pulses also are proportional to the computed decay time for optimum operation. In this connection a signal from the decay time computer 35 is sent through a conductor 36 in the cable 11 to a neutron generator control circuit 37 in the housing 10. The control circuit 37 applies a pulsing signal through a conductor 40 to the neutron source 20 in order to irradiate the earth formation with pulses of neutrons of a duration and repetition rate that are related to the thermal neutron decay time characterizing the formation 14 or, alternatively, of a preselected repetition rate.

Signals from the detectors 21 and 26 are passed through the gate 34 and a gate 41, respectively, in response to enabling pulses from the decay time computer 35 in a conductor 42. Accordingly, as the detector signals corresponding to the neutron distribution observed by the detectors are passed through the gates 34 and 41, they are applied through conductors 43 and 44, respectively, to a formation porosity circuit 45.

As described in more complete detail in the aforementioned Locke et al. patent application, the neutron population observed by the detectors 21 and 26 characterize, to a large extent, the porosity of the earth formation 14. Accordingly, a ratio between the neutron counts registered by the detectors 21 and 26 is struck in the formation porosity circuit 45. This computed ratio is a function of the formation porosity, 0. Consequently, a signal that corresponds to the porosity of the formation 14 is sent through a conductor 46 to a recorder 47. The recorder 47 produces a trace of formation porosity as a function of borehole depth.

In accordance with one aspect of the invention, the portion of the neutron signals most representative of the formation porosity is selected automatically for the aforementioned computation. Illustrative of this is FIG. 2 which shows two curves 50 and 51 that characterize the neutron counts registered by the detectors 21 and 26, respectively, as a function of the time between successive bursts of neutrons. The portions of these curves adjacent to the origin of the graph represent the increase in the formation neutron population during and immediately after a neutron burst.

After the peak neutron population is passed, the slopes that distinguish the sharp declines that characterize the portions 52 and 53 of the curves 50 and 51, respectively, largely measure the borehole parameters, as for example, borehole fluid salinity and the like. The slopes of the curves 50 and 51 flatten out in portions 54 and 55. These portions 54 and 55 are representative of the formation porosity and other characteristics of interest. The terminal portions 56 and 57 of the curves 50 and 51 are more or less constant, and represent the normal radiation background registered by the detectors 21 and 26 in the environment established by the formation 14.

As hereinbefore described, the decay time computer 35 gates the signals from the detectors 21 and 26 through to the formation porosity circuit 45. The signals that are gated through are the portions 54 and 55 of the curves 50 and 51, respectively, that most accurately represent the porosity of the formation 14. The depth of investigation may be regulated, moreover, through selection of appropriate parts of the curve portions 54 and 55. The more delayed the measurement, generally, the more deeply within the formation the measurement is conducted.

Figure 2:
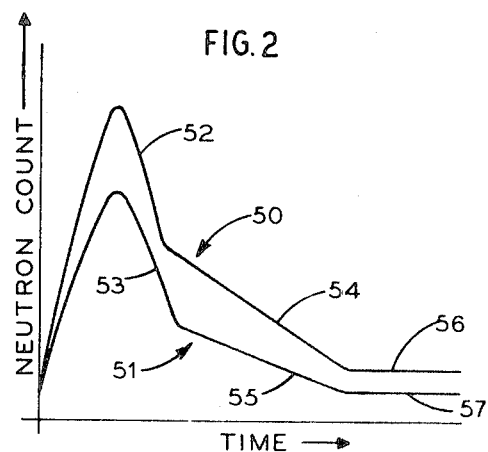
FIG. 2 is a schematic graph of a neutron time-distribution as registered in two detectors within a borehole.

For best operation, the neutron ratio circuit 45 (FIG. 1) responds to a continuous signal from the neutron detectors 21 and 26. By the very nature of the logging technique, however, the decay time computer 45 responds to the detector signals only during the curve portions 54 and 55 (FIG. 2). Thus, the porosity signal actually recorded is an intermittent, rather than a continuous, function of borehole depth.

In some circumstances, the signal for the decay time computation preferably may be taken from the long-spaced detector 26. The detectors 21 and 26 also can be arranged within the housing 10 to straddle the neutron source 20. For purposes of the decay time calculation, a signal that is related to the thermal neutron population is desired. The porosity computation, however, is most accurate when based on a spectrum of neutron energies that include the thermal and epithermal neutron energy ranges. In order to provide these two signals, a pulse height discriminator can be incorporated in the decay time computer 35 to filter out the detector signals that correspond to the epithermal neutron counts. The gates 34 and 31, however, do not eliminate the epithermal neutron counts and thereby pass signals to the porosity circuit 45 that correspond to the thermal and epithermal neutrons registered by the detectors 21 and 26.

Although the housing 10 as shown in the drawing is drawn freely through the borehole 12, characteristics of the formation 14 and the borehole environment may make it advisable to centralize the housing 10 within the borehole 12 by means of bowsprings, or the like. Depending on these physical conditions, it may be more appropriate to urge the housing 10 against the borehole wall with the aid of a backup pad.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A system for computing the porosity of an earth formation traversed by a borehole comprising a source of neutrons for irradiating the formation with pulses of neutrons, a means for producing a signal that corresponds to the thermal neutron absorption time within the borehole environment, circuit means responsive to said thermal neutron absorption signal means for producing a gating signal that is automatically related primarily to the thermal neutron absorption time characterizing the earth formation as the earth formation strata change along the length of the borehole as distinguished from the thermal neutron absorption time that characterizes the borehole, gate means responsive to said gating signal circuit means for passing a portion of said thermal neutron absorption signal that is related to the porosity of the earth formation as distinguished from a characteristic of the borehole, and further circuit means responsive to said gated signal portion for producing another signal that corresponds to the earth formation porosity measured only during said thermal neutron absorption time that characterizes the earth formation in response to said gating signal means.

2. A system according to claim 1 wherein said gate means comprise means for passing a portion of said neutron absorption signal that corresponds to the thermal and epithermal neutron distribution in the earth formation.

3. A system according to claim 1 wherein said further circuit means comprises means to produce a ratio signal that corresponds to the earth formation porosity.

* * * * *